US008693013B2

(12) United States Patent
Yamamichi

(10) Patent No.: US 8,693,013 B2
(45) Date of Patent: Apr. 8, 2014

(54) PRINTING CONTROL FOR TRANSMITTING PRINT DATA AND PRINT SETTING DATA TO A PRINTING APPARATUS

(75) Inventor: Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 710 days.

(21) Appl. No.: 12/648,290

(22) Filed: Dec. 28, 2009

(65) Prior Publication Data

US 2010/0182627 A1 Jul. 22, 2010

(30) Foreign Application Priority Data

Jan. 16, 2009 (JP) ................................ 2009-008243

(51) Int. Cl.
*G06F 3/12* (2006.01)

(52) U.S. Cl.
USPC ......................... 358/1.13; 358/1.14; 358/1.15

(58) Field of Classification Search
CPC ..... G06F 3/1285; G06F 3/1206; G06F 3/128; G06F 3/1284
USPC ...................................... 358/1.13, 1.14, 1.15
See application file for complete search history.

(56) References Cited

U.S. PATENT DOCUMENTS

| | | | | |
|---|---|---|---|---|
| 2001/0024291 | A1 * | 9/2001 | Mori et al. | 358/1.12 |
| 2003/0202198 | A1 * | 10/2003 | North | 358/1.13 |
| 2008/0180713 | A1 * | 7/2008 | Kodera | 358/1.13 |
| 2009/0097056 | A1 * | 4/2009 | Kim et al. | 358/1.15 |

FOREIGN PATENT DOCUMENTS

| | | | |
|---|---|---|---|
| JP | 2000-207148 | A | 7/2000 |
| JP | 2000-222145 | A | 8/2000 |

OTHER PUBLICATIONS

"XPS Drv Filter Pipeline", URL:http://www.microsoft.com/whdc/device/print/XPSDrv_FilterPipe.mspx, Feb. 7, 2008, p. 3.

* cited by examiner

*Primary Examiner* — Jacky X Zheng
(74) *Attorney, Agent, or Firm* — Fitzpatrick, Cella, Harper & Scinto

(57) ABSTRACT

This invention is directed at preventing unnecessary processing and CPU load of a PC when always printing via a printer driver, and avoiding the omission of a printer driver function when always performing direct printing. When using a printer having a direct printing function, which of printing via the printer driver and direct printing is to be done is determined in accordance with print settings of each print job, and then printing is executed. A function to be implemented by the driver among set functions is determined (S504). If there is a function to be implemented by the driver, it is determined whether to give priority to direct printing (S505). If no priority is given to direct printing, the driver is used; otherwise, direct printing is performed.

9 Claims, 13 Drawing Sheets

PRINT

GENERAL

SELECT PRINTER

| NAME | DOCUMENT | STATUS | COMMENT |

- Printer1
- ADD PRINTER

— 1001

STATUS: READY
WHERE:
COMMENT:

☐ PRINT TO FILE(F)  PROPERTIES(R)

FIND PRINTER(D)...  — 1002

PAGE RANGE

◉ ALL(L)
○ SELECTION(T)  COPIES(C): 1
○ PAGES(G)
○ CURRENT PAGE(U)

☐ COLLATE(O)

[PRINT(P)] — 1003   [CANCEL] — 1004   [APPLY(A)] — 1005

```
<PrintTicket>
<Feature name="PageOrientation">
<Option name="Portrait"/>
</Feature>
<Feature name="DocumentCollate">
<Option name="Collated"/>
</Feature>
<Feature name="SecurePrint">
<Option name="On"/>
</Feature>

    :
<Feature name="JobInputBin">
<Option name="AutoSelect"/>
</Feature>
<psf:Feature name="ns0000:JobHostProcess">
<psf:Option name="ns0000:Auto"/>
<psf:Feature />
</PrintTicket>
```

PRINT SETTING DESCRIPTION PART

DIRECT PRINTING DETERMINATION DESCRIPTION

FIG. 12

```
<PrintTicket>
<Feature name="PageOrientation">
<Option name="Portrait"/>
</Feature>
<Feature name="DocumentCollate">
<Option name="Collated"/>
</Feature>
<Feature name="SecurePrint">
<Option name="On"/>
</Feature>

    :

<Feature name="JobInputBin">
<Option name="AutoSelect"/>
</Feature>
<psf:Feature name="ns0000:JobHostProcess">
<psf:Option name="ns0000:On"/>
<psf:Feature />
</PrintTicket>
```

PRINT SETTING DESCRIPTION PART

DIRECT PRINTING DETERMINATION DESCRIPTION

FIG. 13

```
<PrintTicket>
<Feature name="PageOrientation">
<Option name="Portrait"/>
</Feature>
<Feature name="DocumentCollate">
<Option name="Collated"/>
</Feature>
<Feature name="SecurePrint">
<Option name="On"/>
</Feature>

    :
<Feature name="JobInputBin">
<Option name="AutoSelect"/>
</Feature>
<psf:Feature name="ns0000:JobHostProcess">
<psf:Option name="ns0000:Off "/>
<psf:Feature />
</PrintTicket>
```

PRINT SETTING DESCRIPTION PART

DIRECT PRINTING DETERMINATION DESCRIPTION

PRINTING CONTROL FOR TRANSMITTING PRINT DATA AND PRINT SETTING DATA TO A PRINTING APPARATUS

BACKGROUND OF THE INVENTION

1. Field of the Invention

The present invention relates to a printing control apparatus and printing control method. More particularly, the present invention relates to a printing control apparatus and printing control method in a system including an information processing apparatus such as a personal computer (to be referred to as a PC) and a printing apparatus such as a printer.

2. Description of the Related Art

Conventionally in printing, a printer driver runs on a computer such as a PC. The printer driver converts print data created by an application and an operating system (to be referred to as an OS) such as Microsoft Windows® into print data (e.g., PDL data or image) processible by a printer. The printer driver transfers the converted print data to the printer to print. The intervention of the printer driver allows usage of the many functions provided by it in printing. However, this configuration requires OS-dependent processing and processing by the printer driver, which occupies the CPU of the PC. The printer driver converts print data into a language processible by a printer, such as PDL data or an image, so processing to reacquire, reedit and then reuse print data transmitted to a printer is difficult.

As another configuration of a printing system, print data created by an application is directly transmitted to a printer without converting it into PDL data, an image, or the like, and the printer interprets the print data to print. The printing form of directly transferring print data created by an application to a printer is called direct printing. For example, an application creates print data in the PDF (Portable Document Format) available from Adobe, and directly transmits it to a printer.

In a printing system called XPS introduced in Microsoft Windows Vista®, application data converted into the XPS data format is converted into PDL data for transmission. This printing system can also handle transmission of XPS format print data to a printer to print.

According to a conventional technique, a printer driver directly transfers a file created and saved by an application program to a spooler after conversion without reading the file into the application, thereby directly printing out the file (see, e.g., patent reference 1). As another technique, it is determined which of a printer driver (PC) and a printer can process data more efficiently, and then printing is done (see, e.g., patent reference 2). As still another technique, an application designates whether to perform processing by a printer driver, thereby switching the printing method between printing via a printer driver and printing by directly transmitting data to a printer (see, e.g., non-patent reference 1).

[Patent Reference 1] Japanese Patent Laid-Open No. 2000-207148

[Patent Reference 2] Japanese Patent Laid-Open No. 2000-222145

[Non-patent Reference 1] Microsoft Cooperation, "XPS-Drv_FilterPipe.docx" (particularly p. 12, FIG. 5), [online], updated Feb. 7, 2008, [searched Aug. 25, 2008], at the website www.microsoft.com at subdirectory XPSDrv_FilterPipe.mspx of subdirectory print of subdirectory device of subdirectory of whdc However, in conventional direct printing, it is not determined whether designated print settings require processing by a printer driver (PC), and print data is directly transmitted to a printer. As a result, a set function may not be achieved. For example, there is a function for which the printer driver displays a dialog in printing. The dialog prompts the user to enter his user name and password, and whether to permit or prevent printing is decided based on the input contents. When, however, direct printing is performed as mentioned above, the printer driver does not intervene and thus no dialog can be displayed. Print data is transmitted to a printer, failing to permit/inhibit printing. The invention disclosed in patent reference 1 obviates the need to load a specific application, reducing processing in the PC. However, the printer driver converts print data obtained from an application into an image or PDL data regardless of print settings, and thus processes such as reacquisition and reediting of print data transmitted to a printer are difficult. In addition, the problem of the CPU of the PC being occupied is not solved. In the invention disclosed in patent reference 2, processing is executed by more efficient hardware out of a printer driver (PC) and printer. When it is decided to perform processing using the printer driver, the printer driver (PC) always executes processing regardless of print settings. Hence, the problem of the CPU of the PC being occupied still remains. When it is decided to perform processing using the printer, print data is directly transmitted to the printer regardless of print settings, and the problem of failing to implement some functions goes unsolved.

SUMMARY OF THE INVENTION

The present invention has been made in consideration of the above situation to solve the above problems. More specifically, it is determined in accordance with print setting data whether a print job to be executed requires processing by a printer driver. Printing is done based on this determination result. If processing by the printer driver is unnecessary, print data is directly transmitted to a printing apparatus; otherwise, printing is executed via the printer driver. This can decrease the print processing load on the CPU of a PC and reduce unnecessary processing. Printing can be appropriately performed without omission of a function set in print settings.

The present invention comprises the following arrangement.

According to an aspect of the present invention, printing control apparatus which controls a printing apparatus by using print data generated by an application program and print setting data for the print data, comprises: a first determination unit, configured to determine whether the printing apparatus is capable of direct printing; a second determination unit, configured to, when the first determination unit determines that the printing apparatus is capable of direct printing, determine whether the print setting data contains a setting requiring printer driver processing; and a notification unit, configured to, when the second determination unit determines that the print setting data does not contain the setting requiring printer driver processing, notify the application program that the print data can be directly transmitted to the printing apparatus, and otherwise, notify the application program that the print data cannot be directly transmitted to the printing apparatus.

According to another aspect, a printing control apparatus which controls, by using print data generated by an application program and print setting data for the print data, a printing apparatus capable of interpreting print data output from the application, comprises: a second determination unit, configured to determining whether the print setting data contains a setting requiring printer driver processing; and a notification unit, configured to, when the second determination unit determines that the print setting data does not contain the setting requiring printer driver processing, notify the application program that the print data can be directly transmitted to the printing apparatus, and otherwise, notify the application program that the print data cannot be directly transmitted to the printing apparatus.

According to the present invention, print processing having print settings requiring printer driver processing is executed via the printer driver. As for print processing having print settings requiring no printer driver processing, direct printing can be permitted. The load of the CPU of a PC can therefore be decreased to reduce unnecessary processing. Printing can be properly performed without omitting a function set in print settings.

Further features of the present invention will become apparent from the following description of exemplary embodiments (with reference to the attached drawings).

BRIEF DESCRIPTION OF THE DRAWINGS

FIG. 11 is a view exemplifying print settings created by the application;

FIG. 12 is a view exemplifying print settings which are processed by the printer driver and determined to require direct printing; and FIG. 13 is a view exemplifying print settings which are processed by the printer driver and determined to require printing via the printer driver.

DESCRIPTION OF THE EMBODIMENTS

Figure 1:
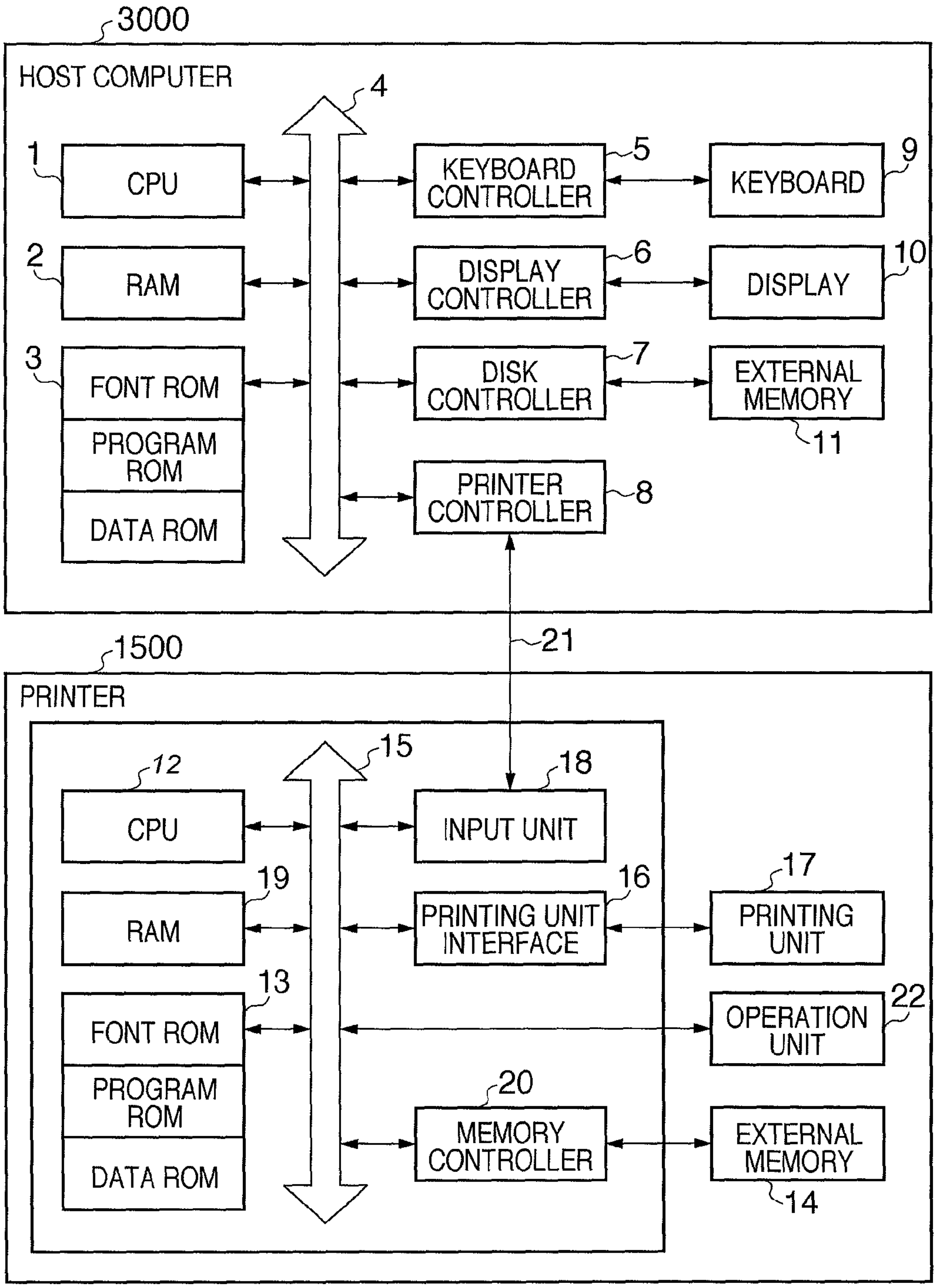
FIG. 1 is a block diagram showing the configuration of a printing system according to an embodiment of the present invention.

Preferred embodiments of the present invention will be described below in detail with reference to the accompanying drawings. The same reference numerals denote the same building components, and a description thereof will not be repeated.

<System Configuration>

FIG. 1 is a block diagram showing the configuration of a printing system according to an embodiment of the present invention. In the embodiment, the system shown in FIG. 1 may be formed from a single device or a plurality of devices. The system may be connected via a network such as a LAN or WAN and perform processing. As shown in FIG. 1, a host computer (printing control apparatus) 3000 includes a CPU 1. The CPU 1 controls execution of document processing and print processing based on it in accordance with a document processing program and the like stored in the program ROM of a ROM 3 or an external memory 11. The document processing includes processes in embodiments for documents containing figures, images, texts, and tables (including a spreadsheet). The CPU 1 controls devices connected to a system bus 4. The program ROM of the ROM 3 or the external memory 11 stores an operating system program (OS) and the like serving as control programs of the CPU 1. The font ROM of the ROM 3 or the external memory 11 stores font data and the like used in document processing. The data ROM of the ROM 3 or the external memory 11 stores various data used to perform document processing and the like. A RAM 2 functions as a main memory, work area, and the like for the CPU 1. A keyboard controller 5 controls input from a keyboard 9 and a pointing device (not shown). A display controller 6 controls display on a display 10. A disk controller 7 controls access to the external memory 11. The external memory 11 includes a hard disk and Floppy® disk which store a boot program, various kinds of applications, font data, user files, edit files, printer control command generation program, and the like. A printer controller 8 is connected to a printer 1500 via a network or a bidirectional interface 21, and executes communication control processing with the printer 1500. Based on commands designated with a mouse cursor (not shown) or the like on the display 10, the CPU 1 opens a variety of windows registered in advance and executes various data processes. When executing printing, the user can open a window associated with print settings to set a print processing method such as setting of a printer and selection of a print mode.

A CPU 12 controls the printer 1500. Based on a control program or the like stored in a ROM 13 or a control program or the like stored in an external memory 14, the CPU 12 outputs an image signal serving as printout information via a printing unit interface 16 to a printing unit 17 connected to a system bus 15. The printing unit 17 will also be called a printer engine. The program ROM of the ROM 13 stores control programs and the like for the CPU 12. The font ROM of the ROM 13 stores font data and the like used to generate printout information. The data ROM of the ROM 13 stores information used in the computer when the printer does not have an external memory 14 such as a hard disk. The CPU 12 can communicate with the host computer 3000 via an input unit 18, and notifies the host computer 3000 of information and the like in the printer 1500. A RAM 19 functions as a main memory, work area, and the like for the CPU 12. The memory capacity can be expanded by an optional RAM connected to an expansion port (not shown). The RAM 19 is used as an output information rendering area, environmental data storage area, NVRAM, and the like. A memory controller 20 controls access to the external memory 14 such as a hard disk or IC card. The external memory 14 is connected as an option, and stores font data, emulation programs, form data, and the like. An operation unit 22 is, for example, an operation panel and includes switches, LED display, and the like for manipulation by the user. In the embodiment, the printer 1500 may include an NVRAM (not shown) to store printer mode setting information input from the operation unit 22. In the embodiment, the printing unit 17 is an electrophotographic printer engine but may comply with another printing method instead of the electrophotographic method.

The storage locations of programs and data are merely examples, and programs and data may be stored in a medium other than the above-mentioned storage locations.

Figure 2:
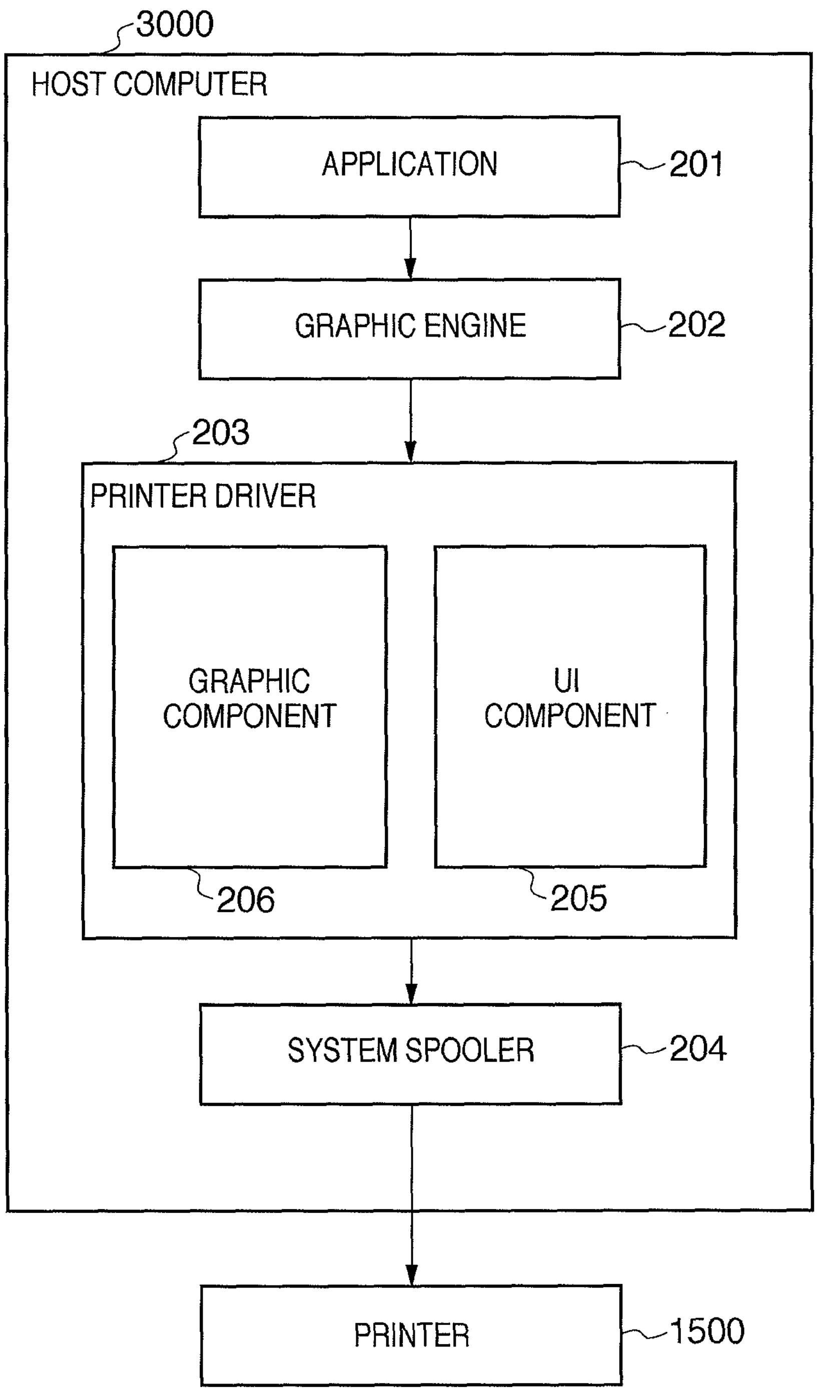
FIG. 2 is a block diagram exemplifying the arrangement of a host computer shown in FIG. 1.

FIG. 2 is a block diagram showing an arrangement for print processing in the computer 3000 shown in FIG. 1. An application 201, graphic engine 202, printer driver 203, and system spooler 204 exist as program files saved in the external memory 11. These files are program modules which are loaded into the RAM 2 and executed by an OS or a module using these modules.

The application 201 and printer driver 203 can be added to the HD of the external memory 11 from the FD of the external memory 11 or a CD-ROM (not shown) or via a network (not shown). The application 201 saved in the external memory 11 is loaded into the RAM 2 and executed. When printing from the application 201 using the printer 1500, data is output (rendered) using the graphic engine 202 which has been similarly loaded into the RAM 2 and is ready.

The graphic engine 202 loads, from the external memory 11 into the RAM 2, the printer driver 203 prepared for each printing apparatus such as a printer. The graphic engine 202 receives print settings or print data from the application 201 and outputs them to the printer driver 203. A UI component 205 of the printer driver 203 receives print settings from the graphic engine 202, displays and changes them, and sends them back to the application via the graphic engine. A graphic component 206 of the printer driver 203 receives print data from the graphic engine 202, and converts it into a control command, for example, PDL (Page Description Language) data recognizable by the printer. The converted printer control command passes through the system spooler 204 which has been loaded into the RAM 2 by the OS, and then is output as print data to the printer 1500 via the interface 21.

<Settings Associated with Direct Printing>

Figure 6:
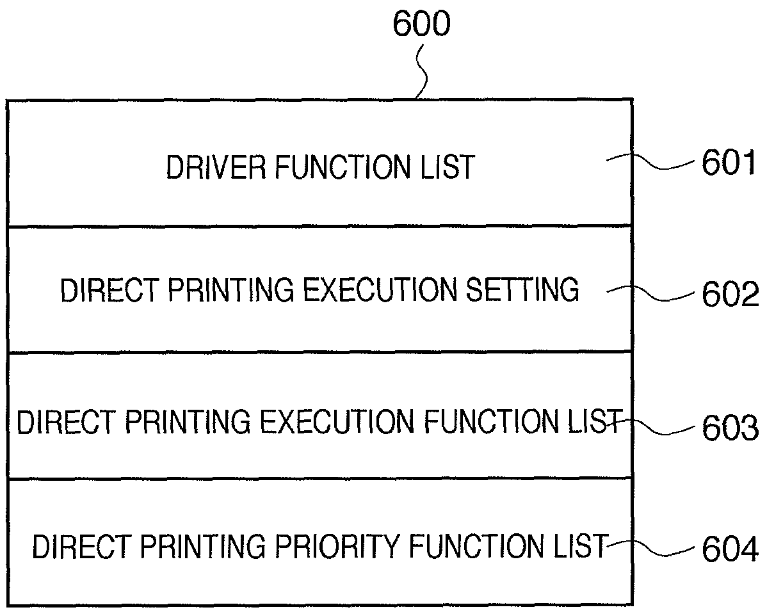
FIG. 6 is a view showing direct printing setting information held in a printer driver.
Figure 7:
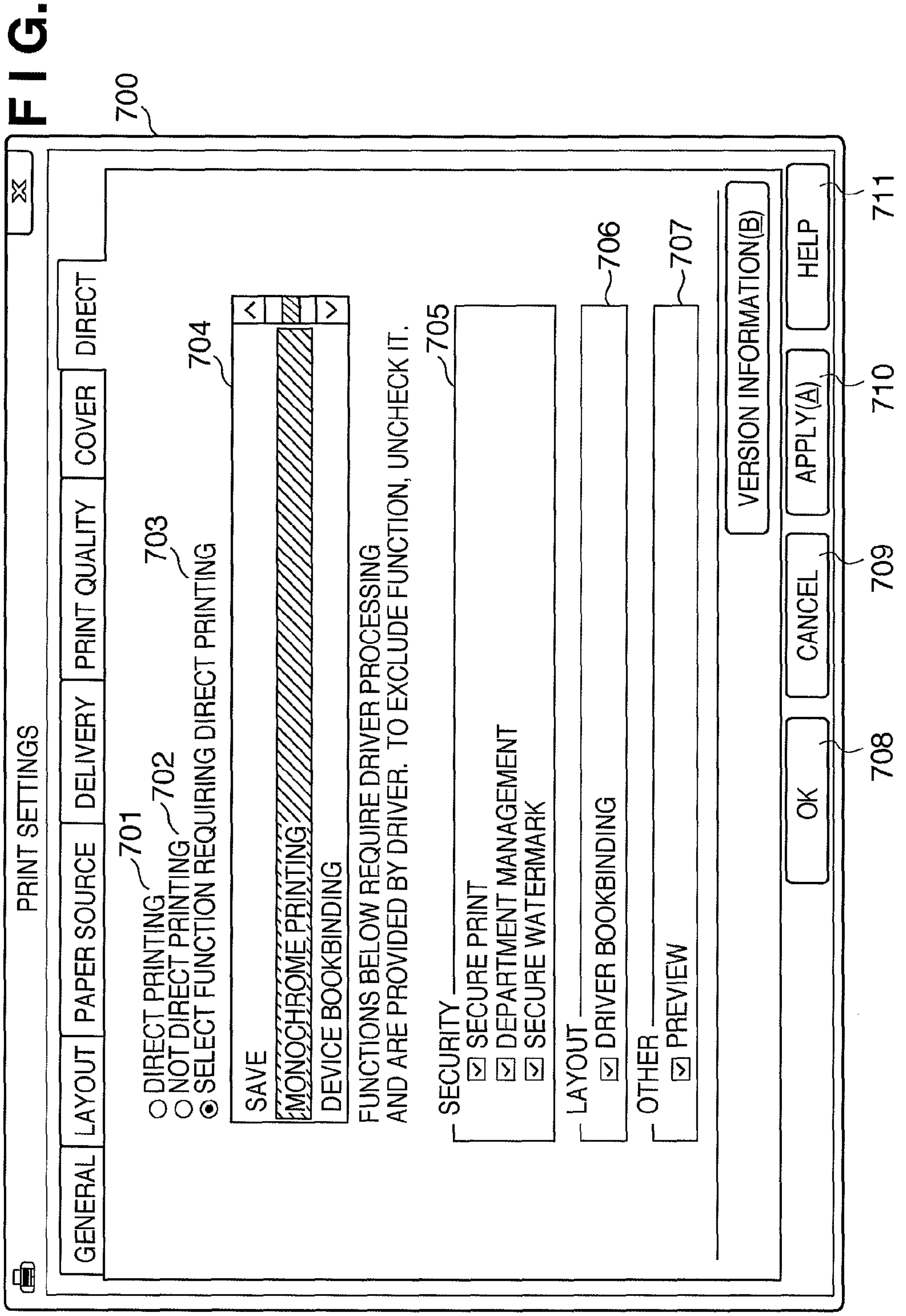
FIG. 7 is a view exemplifying a window for setting direct printing setting information in the printer driver.

Direct printing setting information held in the printer driver 203 will be explained with reference to FIGS. 6 and 7. FIG. 6 is a view showing setting information regarding direct printing that is held in the printer driver 203 according to the present invention. FIG. 7 is a view exemplifying a user interface for making settings associated with direct printing that are held in the printer driver 203 according to the present invention.

Referring to FIG. 6, setting information 600 is direct printing setting information (to be also simply referred to as setting information) regarding direct printing that is held in the printer driver 203. The setting information 600 may be saved as a registry or file in the external memory 11 such as a hard disk (HD) or held by a program. The setting information 600 includes items 601 to 604.

The driver function list 601 stores list information of functions except for those implementable by the printer 1500 among all functions implementable by the printing system in the embodiment. More specifically, the driver function list 601 stores a list of functions necessary to operate the printer driver 203 to implement them. The functions described in the information generally change depending on the type and state of the printer 1500. When it is set to give priority to direct printing, the printer driver transmits print data 303 received in printing to the printer 1500 via the spooler 204 without converting it into PDL data, an image, or the like. When it is set not to give priority to direct printing, the printer driver converts print data into print data 305 such as PDL data or an image, as usual, and transfers the print data 305 to the printer 1500 via the spooler 204. In the embodiment, print settings can contain functions implementable by the printing system by describing the functions in a job ticket which defines a print job. The direct printing execution setting 602 is a setting item indicating whether to perform direct printing. When it is set in the direct printing execution setting 602 to perform direct printing, a list of functions stored in the direct printing-recommended function list 603 becomes valid. These functions require execution of direct printing when set in printing. The direct printing priority function list 604 stores a list of functions for which priority is given to direct printing and processing by the printer driver is unnecessary, out of functions which should be originally implemented by the printer driver. The printer driver 203 determines that functions for which direct printing is preferentially set in the direct printing priority function list 604 do not require processing by the printer driver 203. This processing will be explained with reference to the flowcharts of FIGS. 4 and 5 in print processing.

A dialog 700 is an example of a dialog for setting the setting information 600 regarding direct printing. The dialog 700 is formed as part (a tab) of a user interface provided by the printer driver 203. The dialog 700 is displayed via the application 201 or the user interface of the OS. The user selects one of print setting radio buttons 701, 702, and 703. When the user selects the radio button 701, the direct printing execution setting 602 sets to perform direct printing. When the user selects the radio button 702, the direct printing execution setting 602 sets to perform not direct printing but printing after PDL/image conversion. When the user selects the radio button 703, she or he can select, from a list box 704, a function for which direct printing is done. The function selected from the list box 704 is added to the direct printing execution function list 603. When print settings in printing contain a function selected in this list, direct printing is executed. In the example of FIG. 7, monochrome printing is selected, and data having the monochrome print setting undergoes direct printing.

Check boxes 705, 706, and 707 describe categorized functions requiring processing by the printer driver 203. By unchecking each function, the function is stored in the direct printing priority function list 604. For example, all displayed functions are checked in FIG. 7 and none of them is registered as a direct printing priority function. When a given function is registered as a direct printing priority function and print settings contain an instruction to use this function, the print job undergoes direct printing. For example, in FIG. 7, "driver bookbinding" in the check box 706 is not checked, and print settings contain "driver bookbinding". In this case, print data having this print setting undergoes direct printing. When the user presses an OK button 708, a direct printing information storage unit 325 applies the current setting to the setting information 600 regarding direct printing, and then the printer driver user interface 700 disappears. That is, the setting information 600 is updated and saved. When the user presses a cancel button 709, the printer driver user interface 700 disappears without applying the current setting. When the user presses an apply button 710, the direct printing information storage unit 325 applies the current setting to the setting information 600 regarding direct printing. When the user presses a help button 711, the help feature of the printer driver 203 appears.

<Print Processing>

Figure 3:
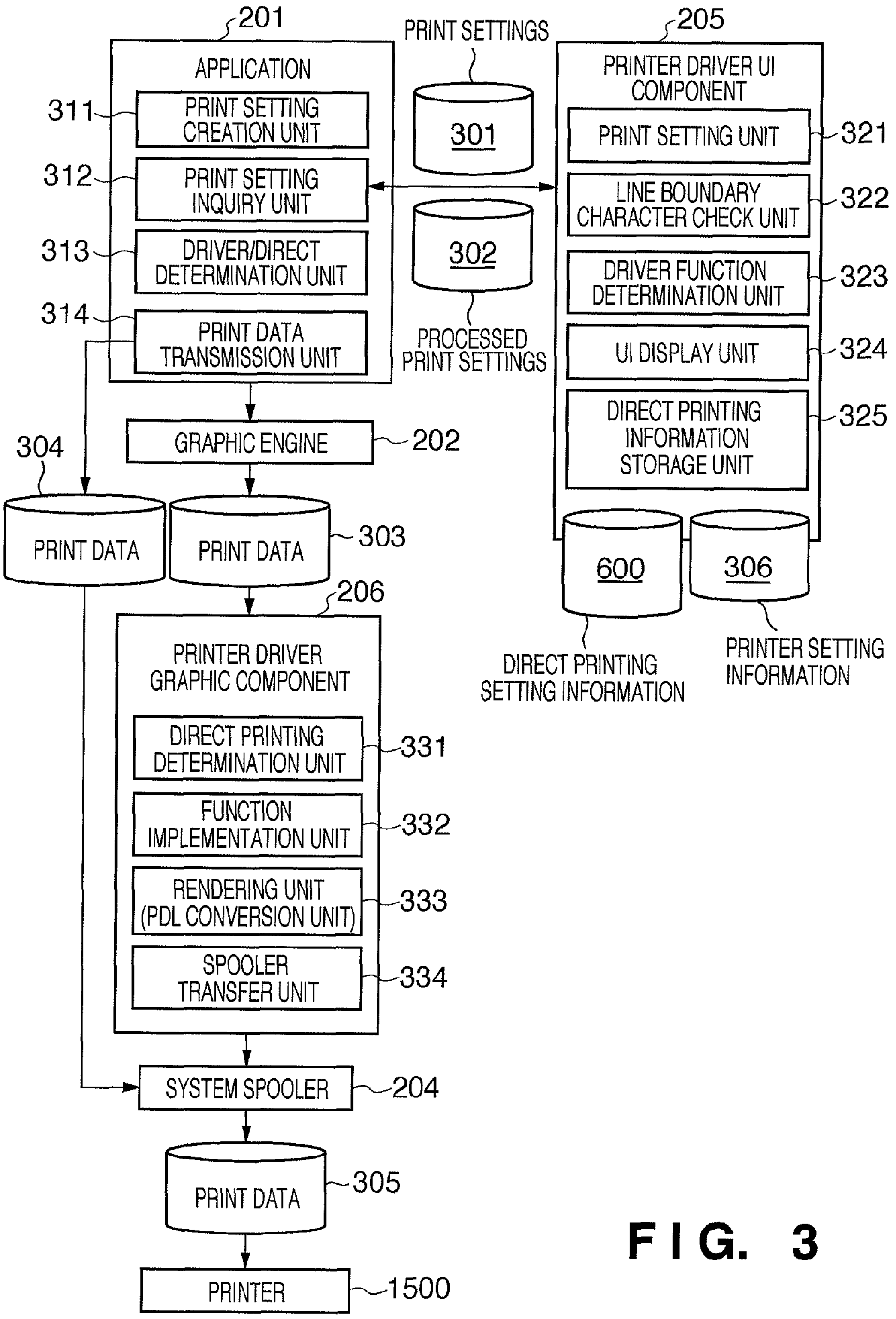
FIG. 3 is a block diagram showing print settings and a system configuration in printing in the embodiment.

The sequence of print processing according to the embodiment of the present invention will now be described with reference to the drawings. FIG. 3 is a block diagram showing a system configuration for printing together with a data flow according to the embodiment. The detailed system configuration and data flow for printing according to the present invention will now be explained with reference to FIG. 3.

Print settings 301 are data set by a print setting creation unit 311 of the application 201. The print settings 301 form, for example, a job ticket and are described in a format interpretable by a specific printer (in this example, XPS format interpretable by an XPS compatible printer). The print settings 301 may also be referred to as print setting data. A print setting inquiry unit 312 transfers the print settings 301 to a print setting unit 321 of the UI component 205. The print setting unit 321 causes a line boundary character check unit 322 to perform line boundary character check for the received print settings 301, and transfers the processed print settings 301 to a UI display unit 324 to display it. A driver function determination unit 323 determines whether a driver function is necessary or unnecessary for implementing the print settings having undergone line boundary character check. If necessary, the user changes the print settings using a printer driver setup window (UI: not shown), and the UI display unit 324 sends back processed print settings 302 to the application 201. The direct printing information storage unit 325 stores the setting information 600 regarding direct printing. The application 201 creates print data 303 or 304 based on the data associated with print rendering and the print settings 302. Based on the processed print settings 302, a driver/direct determination unit 313 determines which of printing via the driver and direct printing is to be performed. A print data transmission unit 314 transmits the print data 303 or 304.

A direct printing determination unit 331 determines whether to perform direct printing using the print data 303 received by the printer driver graphic component 206. A function implementation unit 332 executes processing regarding a function to be implemented by the printer driver 203. A rendering unit (PDL conversion unit) 333 converts the print data 303 into a control command recognizable by the printer, like PDL data. A spooler transfer unit 334 transmits the print data 305 to the system spooler 204. The print data 305 is then output to the printer 1500 via the system spooler 204. The print data 305 is data to be transmitted to the printer 1500. Printer setting information 306 is setting information of the printer and stores a device attached to the printer 1500 (e.g., finisher), settings (e.g., function status), performance (e.g., whether color printing is possible), and the like. This setting information may be uniformly created and held when installing the printer driver 203, or updated by communicating with the printer 1500 when changing the settings of the printer 1500. In the embodiment, the printer setting information 306 contains information indicating whether direct printing is possible.

Figure 4:
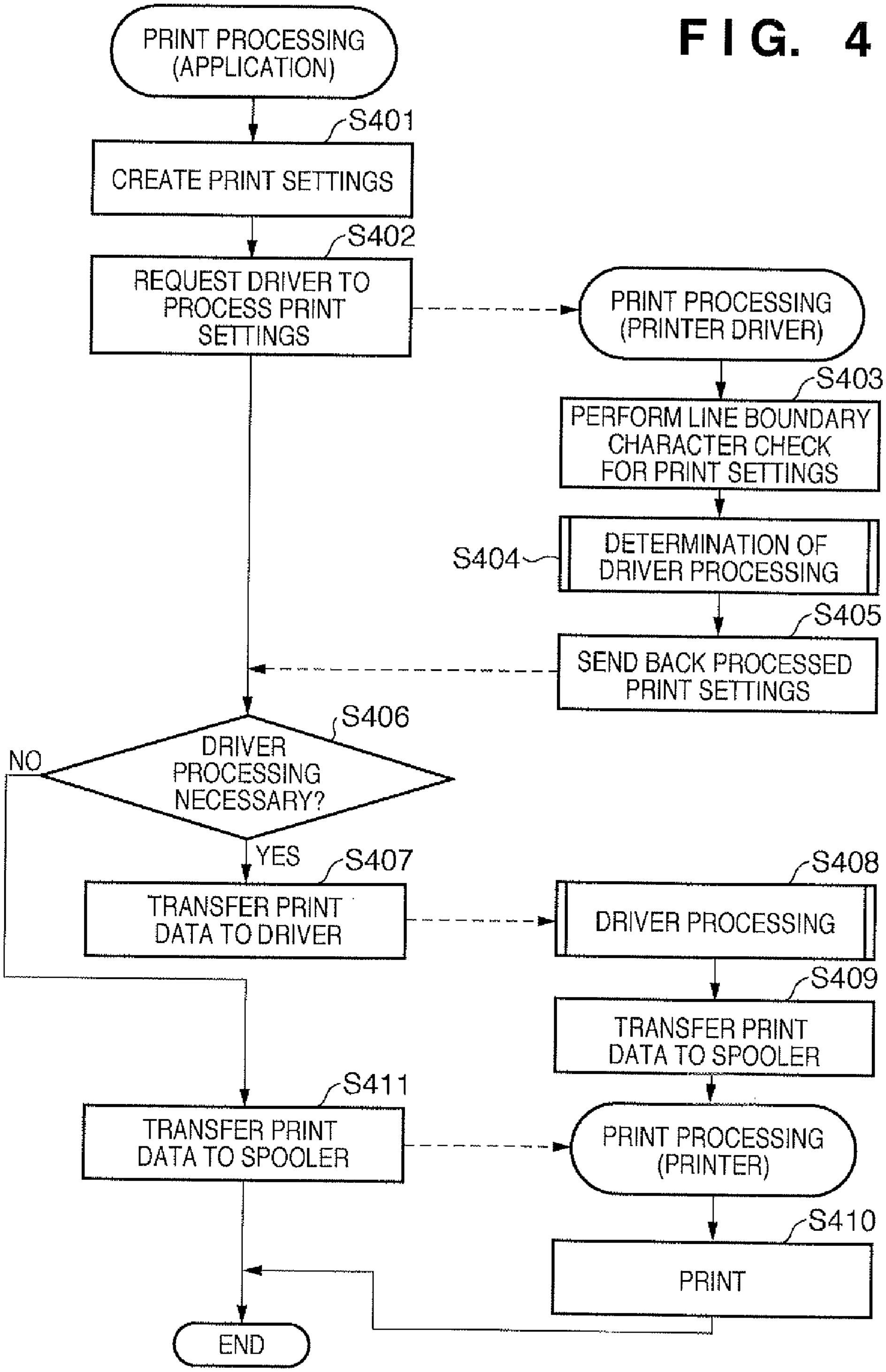
FIG. 4 is a flowchart showing the sequence of direct/printer driver switching print processing in the embodiment.
Figure 10:
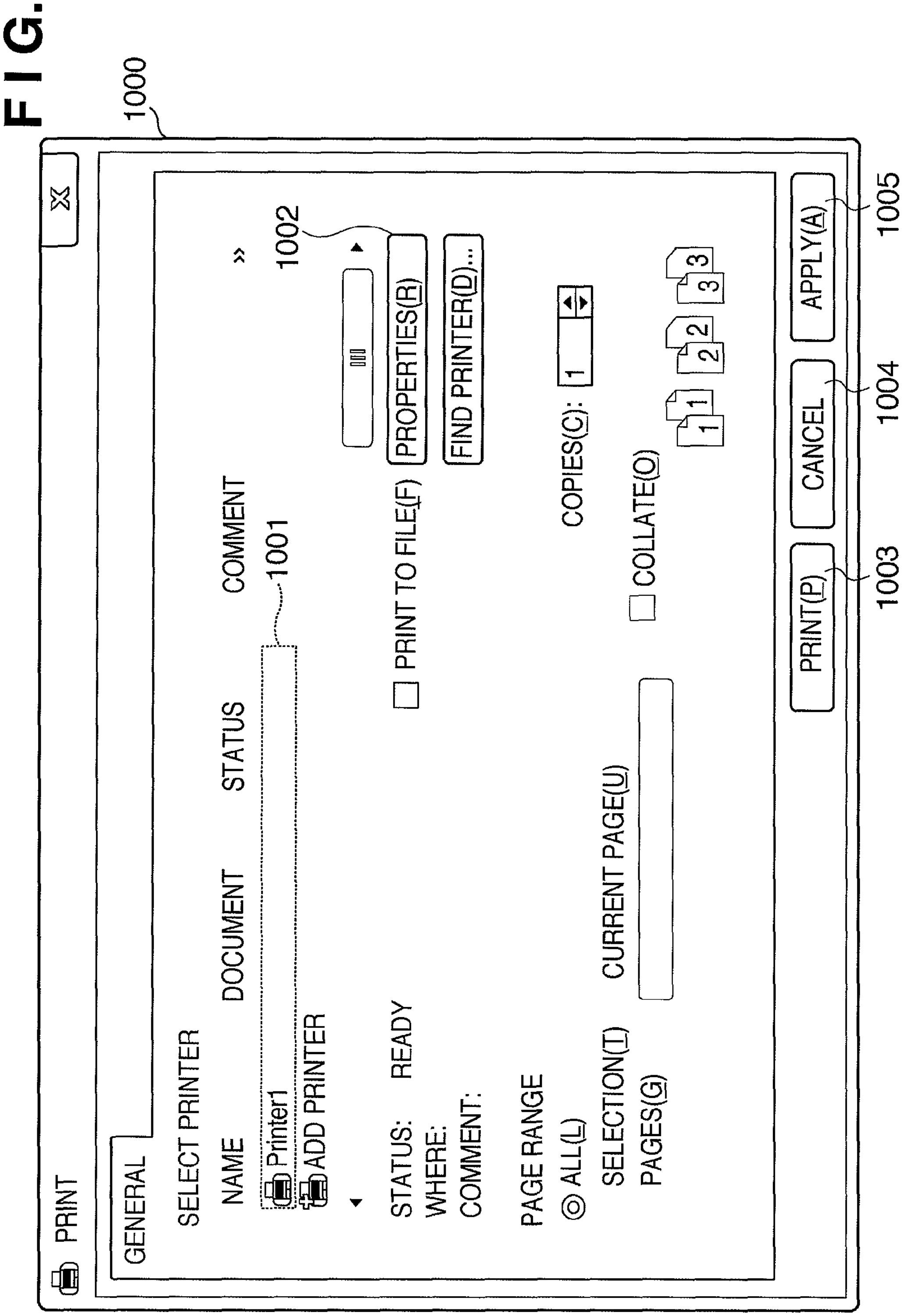
FIG. 10 is a view exemplifying a window displayed by an application in printing.

FIG. 4 is a flowchart showing the sequence of print processing in the embodiment. The CPU 1 reads an associated program to execute each step of a sequence in this specification. FIG. 10 is a view exemplifying the user interface of a print dialog displayed by a general application. The basic sequence of print processing will be explained with reference to FIG. 4. The application program 201 executes steps S401, S402, S406, S407, and S411. The printer driver UI component 205 executes steps S403 to S405. The printer driver graphic component 206 executes steps S408 and S409. The printer 1500 executes step S410.

When the user designates printing via an application window, the print processing in FIG. 4 starts. In step S401, the print setting creation unit 311 creates print settings 301 so as to be able to display a user interface like the window 1000 shown in FIG. 10. The application 201 can hold the print settings 301 in advance before print processing is designated. A printer selection field 1001 in FIG. 10 displays a currently selected printer. When the user presses a print button 1003, the process advances to step S402, and the print setting inquiry unit 312 transfers the print settings 301 to the printer driver UI component 205 and requests processing.

In step S403, the line boundary character check unit 322 performs line boundary character check for the print settings 301 received by the print setting unit 321. In step S404, the driver function determination unit 323 determines whether the print settings having undergone line boundary character check require a driver function, and then creates processed print settings 302. Details of the processing in this step will be described later with reference to FIG. 5. In step S405, the print setting unit 321 sends back the processed print settings 302 to the print setting inquiry unit 312 of the application 201.

When the user presses a button 1002 in FIG. 10, the print settings 301 are transmitted to the printer driver UI component 205. The printer driver can execute processing and display a printer driver setup window on the UI display unit 324. In this processing, processes corresponding to steps S402 to S405 can be done before the user presses the button 1003.

In step S406, the driver/direct determination unit 313 acquires information which is described in the processed print settings 302 received by the print setting inquiry unit 312 and indicates whether direct printing is possible. Subsequently, the driver/direct determination unit 313 determines whether printing via the printer driver is to be performed or direct printing is possible. More specifically, the application receives, from the printer driver, a notification indicating whether direct printing is possible. Based on the notification contents, the application determines whether driver processing is necessary. If the driver/direct determination unit 313 determines that the print settings require the intervention of the printer driver, the process advances to step S407. If the driver/direct determination unit 313 determines that direct printing should be performed, the process advances to step S411. In step S407, the print data transmission unit 314 transmits the print data 303 to the printer driver graphic component 206 via the graphic engine 202.

By the processes in steps S401 to S407, the application 201 can determine, based on print settings, whether processing by the printer driver graphic component 206 is necessary or unnecessary. If it is determined that the processing is unnecessary, wasteful processing by the PC can be omitted. If necessary, a function can be appropriately implemented.

In step S408, the printer driver graphic component 206 receives the print data 303, performs necessary processing, and creates print data 305. Details of this step will be described later with reference to FIG. 8. Note that the print data 305 complies with a format processible by the printer 1500. In step S409, the spooler transfer unit 334 transfers the print data 305 to the system spooler 204. The print data 305 contains the print settings 302 or is transferred together with the print settings 302.

In step S410, the printer 1500 outputs the received print data 305, and the print processing ends.

In step S411, the print data transmission unit 314 transfers the print data 304 to the system spooler 204. The print data 304 contains the print settings 302 or is output together with the print settings 302.

According to this sequence, it is decided whether to transmit a target print job to the printer via the printer driver or directly transmit it from the application to the printer. Based on the decision, print setting data describing the print job, and print data are transmitted to the printer.

<Printer Driver/Direct Determination Processing>

Figure 5:
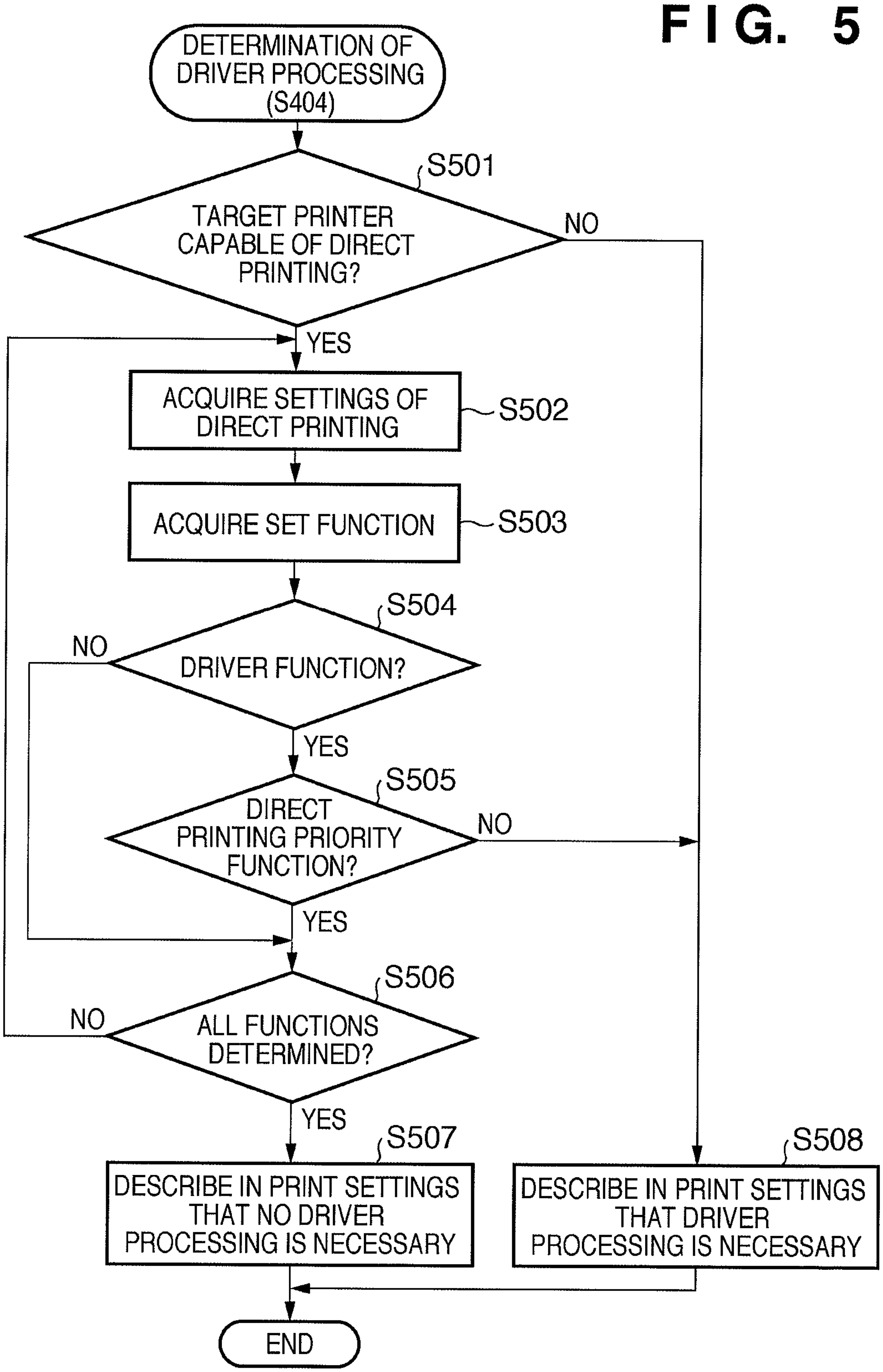
FIG. 5 is a flowchart showing details of direct printing determination processing in the flowchart shown in FIG. 4.

FIG. 5 is a flowchart showing details of the processing (step S404) to determine whether to perform processing using the printer driver 203 in the embodiment.

In step S501, the driver function determination unit 323 refers to the target printer setting information 306 of the printer 1500 to determine whether the printer 1500 is capable of direct printing. If the driver function determination unit 323 determines that the printer 1500 is capable of direct printing, the process advances to step S502; if it determines that the printer 1500 is incapable of direct printing, to step S508. For example, in the embodiment, it is determined whether the printer 1500 is an XPS compatible printer, and if so, it is determined that the printer 1500 is capable of direct printing. As another determination method, the determination may be made using function information indicating whether the printer 1500 has a direct printing function. This determination is the first determination and corresponds to the first determination means. That is, the printer 1500 can interpret print data output from the application.

In step S502, the driver function determination unit 323 acquires the setting information 600 regarding direct printing. In step S503, the driver function determination unit 323 acquires one function from print settings having undergone line boundary character check in step S403. In step S504, the driver function determination unit 323 determines whether the driver function list 601 contains the function acquired in step S503. If the driver function list 601 contains the acquired function, the process advances to step S505; if it does not contain the acquired function, to step S506. The determination in step S504 corresponds to the second determination means for determining whether print settings contain a setting (setting requiring printer driver processing) which cannot be implemented by the printer when the printer is capable of direct printing.

In step S505, the driver function determination unit 323 determines whether the direct printing priority function list 604 contains the function acquired in step S503. If the direct printing priority function list 604 contains the acquired function, the process advances to step S506; if it does not contain the acquired function, to step S508. In other words, this step is to determine whether to ignore a setting (function) which is contained in print settings and cannot be implemented by the printer. This determination corresponds to the third determination means.

In step S506, the driver function determination unit 323 determines whether all functions described in the print settings have been determined.

In step S507, the driver function determination unit 323 creates, from the print settings having undergone line boundary character check, processed print settings 302 describing that processing by the printer driver 203 is unnecessary.

In step S508, the driver function determination unit 323 creates, from the print settings having undergone line boundary character check, processed print settings 302 describing that processing by the printer driver 203 is necessary.

By this sequence, it is written in the processed print settings 302 whether to perform processing by the printer driver in order to implement the print settings. The written determination result serves as a determination target in step S406 of FIG. 4.

In the embodiment, the determination in step S505 is made. However, if it is determined in step S504 that a driver function is necessary, the process may directly branch to step S508. In this case, no direct printing priority function need be set, and if a function provided by the driver is needed, it is inhibited to give priority to direct printing by ignoring the need.

<Processing in Printing via Printer Driver>

Figure 8:
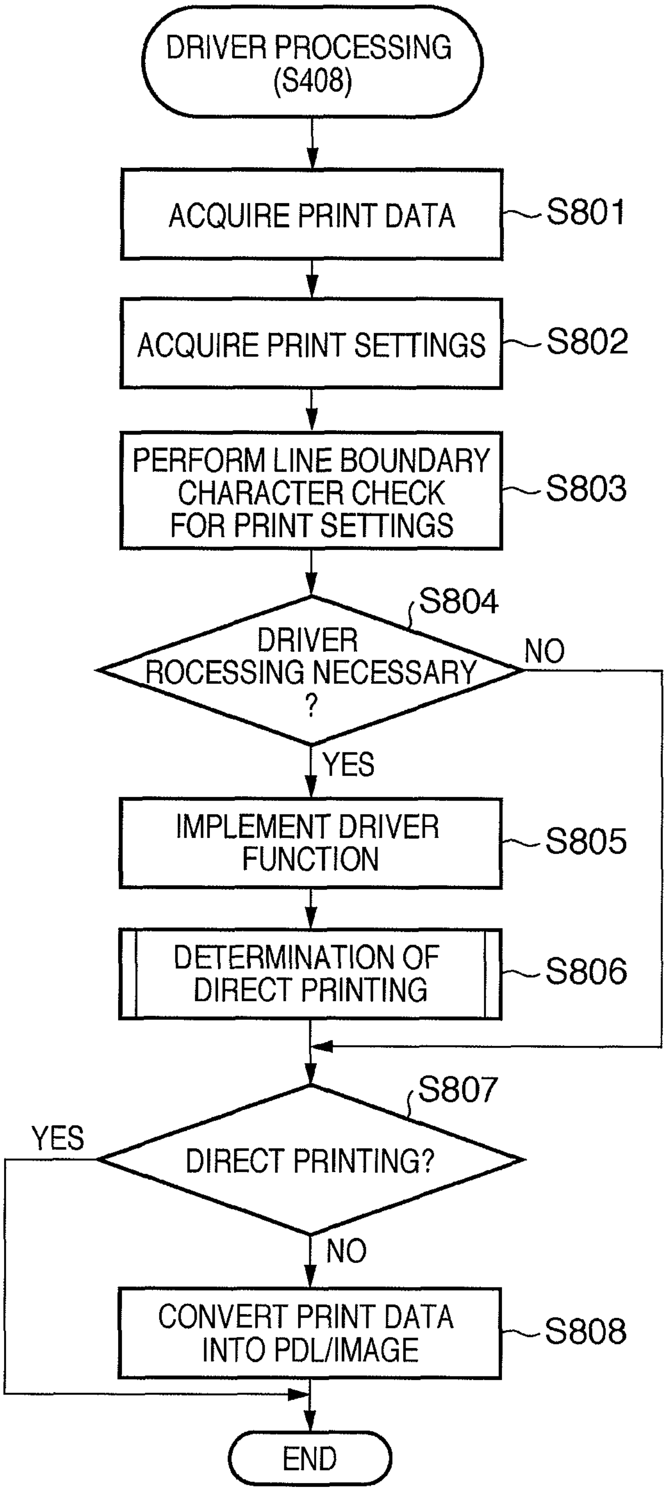
FIG. 8 is a flowchart showing the sequence of printer driver processing in printing.
Figure 9:
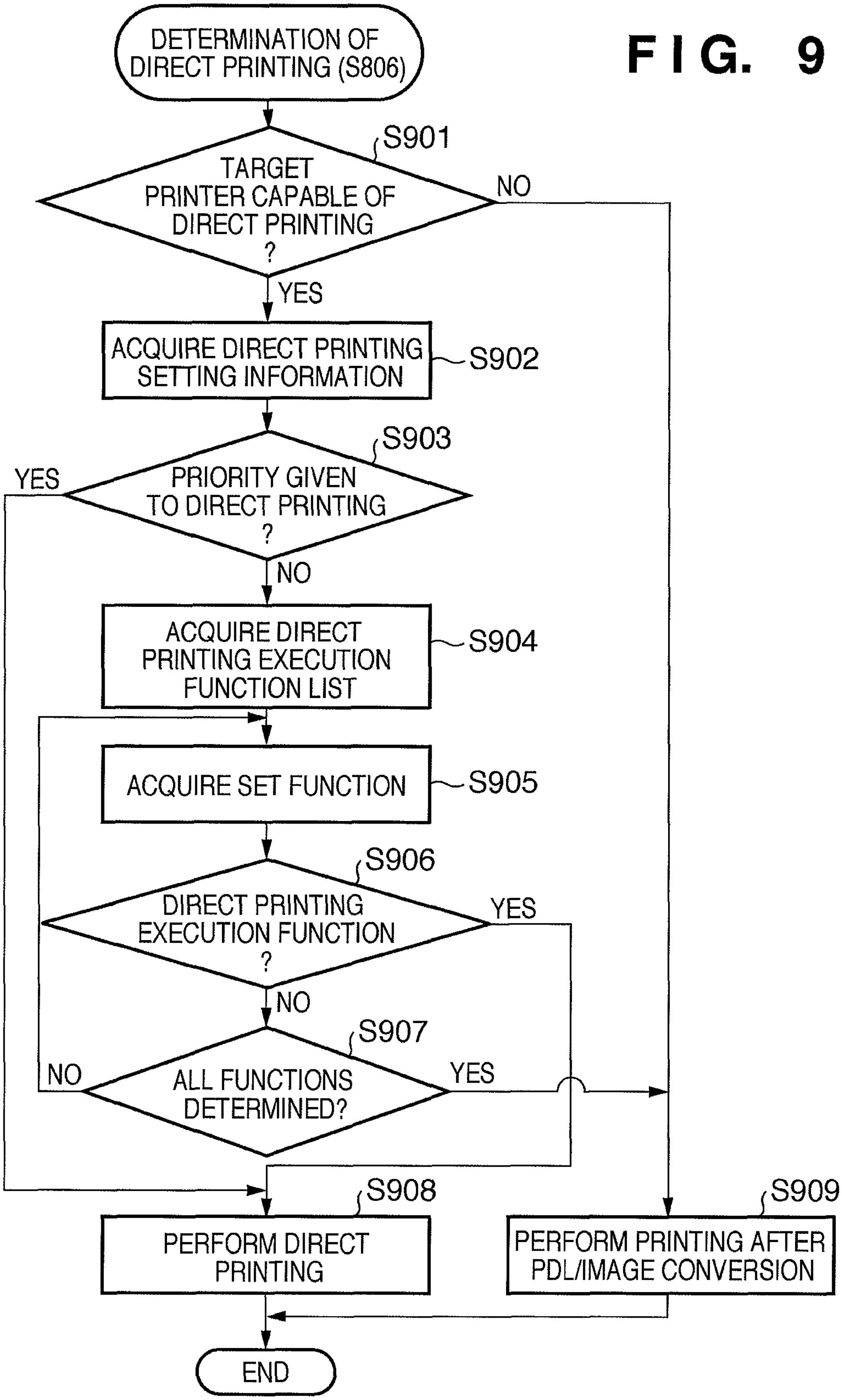
FIG. 9 is a flowchart showing details of the flowchart shown in FIG. 8.

FIG. 8 is a flowchart showing the processing in step S408 by the printer driver 203 in printing. FIG. 9 is a flowchart showing processing in step S806 of FIG. 8 when the printer driver 203 determines whether to perform direct printing. Processing by the printer driver 203 in printing will be explained with reference to FIGS. 8 and 9.

In step S801, the printer driver graphic component 206 acquires the print data 303.

In step S802, the printer driver graphic component 206 acquires the print settings 301 contained in the print data 303.

In step S803, the printer driver graphic component 206 communicates with the printer driver UI component 205, transfers the print settings acquired in step S802 to the print setting unit 321, and requests processing. The line boundary character check unit 322 performs line boundary character check for the received print settings, creating print settings having undergone line boundary character check.

In step S804, the driver function determination unit 323 determines whether the print settings of the print job contain a function to be implemented by the printer driver 203, and then creates processed print settings. Details of the driver function determination processing by the driver function determination unit 323 are the same as step S404 and have been described in steps S501 to S508 with reference to FIG. 5. When the printer driver graphic component 206 performs processing, like step S404, the printer driver has already been active, so the determination of the direct printing priority function in step S505 need not be done. In this case, all functions to be implemented by the printer driver 203 are executed. Direct printing can also be executed immediately when it is determined that there is no function to be implemented by the printer driver 203. The processes of steps S507 and S508 to write determination results in print settings are omitted.

If driver processing is necessary, the function implementation unit 332 of the printer driver graphic component 206 applies a layout in accordance with the print settings or performs additional rendering in step S805.

In step S806, the direct printing determination unit 331 determines whether to perform direct printing without converting the format of the print data 303 received by the printer driver graphic component 206 or convert the print data 303 into PDL data or an image. If the direct printing determination unit 331 determines to perform direct printing (YES in S807), the process ends. If the direct printing determination unit 331 determines to convert the print data 303 into PDL data or an image (NO in S807), the process advances to step S808. Details of the determination processing in step S806 will be described later with reference to FIG. 9.

In step S808, the rendering unit (PDL conversion unit) 333 converts the print data 303 into PDL data or an image, and then the process ends. The converted print data is transmitted to the printer 1500 via the system spooler (step S409).

In this manner, the direct printing determination unit 331 of the printer driver 203 performs direct printing determination processing, so the embodiment may take an arrangement in which the application 201 does not include the driver/direct determination unit 313. While omitting wasteful PC processing by the printer driver 203, a function can be properly implemented to execute direct printing without converting the original data format.

Details of the direct printing determination processing in step S806 will now be explained with reference to FIG. 9. In step S901, the direct printing determination unit 331 determines whether the target printer is capable of direct printing. If the direct printing determination unit 331 determines that the target printer is capable of direct printing, the process advances to step S902; if it determines that the target printer is incapable of direct printing, to step S909.

In step S902, the direct printing determination unit 331 acquires the setting information 600 regarding direct printing.

In step S903, the direct printing determination unit 331 acquires the direct printing execution setting 602 and determines whether priority is given to direct printing. If priority is given to direct printing, the process advances to step S908; if no priority is given to it, to step S904.

In step S904, the direct printing determination unit 331 acquires the direct printing execution function list 603.

In step S905, the direct printing determination unit 331 acquires one function from print settings having undergone line boundary character check.

In step S906, the direct printing determination unit 331 determines whether the direct printing execution function list 603 contains the function acquired in step S905. If the direct printing execution function list 603 contains the acquired function, the process advances to step S908; if it does not contain the acquired function, to step S907.

In step S907, the direct printing determination unit 331 determines whether all functions described in the print settings have been determined. If all functions have been determined, the process branches to step S909; if an undetermined function still remains, it returns to step S905.

In step S908, the direct printing determination unit 331 decides to perform direct printing, and then the process ends. The decided contents are saved for the determination in step S807.

In step S909, the direct printing determination unit 331 decides to perform printing after PDL/image conversion, and the process ends.

<Description of Determination Result of Direct/Printer Driver Printing in Print Settings>

FIG. 11 is a view exemplifying print settings created by the application. FIG. 12 is a view exemplifying print settings which are processed by the printer driver and determined to require direct printing. FIG. 13 is a view exemplifying print settings which are processed by the printer driver and determined to require printing via the printer driver. The description of the determination result of direct/printer driver printing in the print settings will be explained with reference to FIGS. 11 to 13.

In the embodiment, the print settings shown in FIG. 11 are divided into two parts. The first part is a print setting description part designated as a function by the application. The second part is a direct printing determination result description part indicating direct printing or printing via the printer driver. In the print settings shown in FIG. 11, the print setting description part describes settings such as the page orientation and collate. Further in FIG. 11, a secure print function is set. The secure print shown in FIG. 11 is achieved when the setup window of the printer driver 203 is used to prompt the user to enter a user name, document name, and password. That is, execution of secure print requires printing via the printer driver. The direct printing determination result description part in FIG. 11 describes "Auto", which means that the printer driver decides whether to perform direct printing.

The application can also acquire function information of the printer driver and set the function of the printer driver. For example, the application acquires information indicating that the printer driver has the "secure print" function, and displays the secure print function on the setup window of the application.

By using the setup window of the application, the user selects the secure print function. Then, "secure print" is described in the print setting description part designated by the application.

The print settings shown in FIG. 13 are processed print settings obtained by applying processing of the printer driver 203 to the print settings shown in FIG. 11. As described above, the print settings shown in FIG. 11 require secure print processing by the printer driver 203. Thus, the printer driver 203 determines that printing via the printer driver is necessary, and describes "Off" as a setting value in the description part of the determination result of direct printing/printing via the printer driver. This indicates that the printer driver is intervened. The setting value is described in step S507 of FIG. 5 or step S909 of FIG. 9.

The print settings shown in FIG. 12 are processed print settings obtained by applying processing of the printer driver 203 to print settings changed from those shown in FIG. 11 so as not to perform secure print. The printer driver 203 determines that printing via the printer driver is unnecessary, and describes "On" as a setting value in the description part of the determination result of direct printing/printing via the printer driver. This indicates that no printer driver is intervenes. The setting value is described in step S508 of FIG. 5 or step S908 of FIG. 9.

The print settings shown in FIG. 12 are processed print settings obtained by applying processing of the printer driver 203 to print settings shown in FIG. 11. For example, when "secure print" in FIG. 7 of this specification is not checked, the printer driver 203 determines to perform direct printing even if secure print is designated. Hence, "On" is described as a setting value in the description part of the determination result of direct printing/printing via the printer driver, as shown in FIG. 12.

According to the embodiment, whether to perform direct printing can be decided in accordance with printer functions and print settings. As the decision criterion, the importance of a function implemented by the printer driver and the processing efficiency are considered to decide whether to perform direct printing. For example, even if there is a function which cannot be provided by a printer for use, it can be set to give priority to direct printing, that is, ignore the set function. This can decrease the occupancy of the CPU of the PC by print processing and reduce unnecessary processing. Printing can be appropriately done without omitting a function set in print settings.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-008243, filed Jan. 16, 2009 which is hereby incorporated by reference herein in its entirety.

What is claimed is:

1. A printing control apparatus which transmits print data generated by an application program and print setting data for the print data to a printing apparatus, comprising:

a printing apparatus capability determination unit, configured to determine whether the printing apparatus is capable of a direct printing or not;

a first determination unit, configured to determine whether the print setting data contains a setting requiring printer driver processing after said printing apparatus capability determination unit determines that the printing apparatus is capable of the direct printing;

a notification unit, configured to, when said first determination unit determines that the print setting data does not contain the setting requiring printer driver processing, notify the application program that the print data can be directly transmitted to the printing apparatus;

a transfer unit, configured to transfer the print data acquired from the application program to a system spooler; and a transmission unit, configured to transmit the print data from the system spooler to the printing apparatus, wherein the notification unit is configured to, when said printing apparatus capability determination unit determines that the printing apparatus is incapable of the direct printing or said first determination unit determines that the print setting data contains the setting requiring printer driver processing, notify the application program that the print data cannot be directly transmitted to the printing apparatus, wherein said printing apparatus capability determination unit, said first determination unit and said notification unit are functioning as a first component of a printer driver, wherein said transfer unit is functioning as a second component of the printer driver, and wherein said transmission unit is configured to transmit the print data transferred from the application program to the system spooler without the second component of the printer driver when the direct printing is used and said first determination unit determines that the print setting data does not contain the setting requiring printer driver processing.

2. The apparatus according to claim 1, further comprising a second determination unit, configured to determine whether to ignore the setting requiring printer driver processing that is contained in the print setting data, wherein when said first determination unit determines that the print setting data does not contain the setting requiring printer driver processing, or when said second determination unit determines to ignore the setting requiring printer driver processing that is contained in the print setting data, said notification unit notifies the application program that the print data can be directly transmitted to the printing apparatus, and otherwise, notifies the application program that the print data cannot be directly transmitted to the printing apparatus.

3. The apparatus according to claim 1, further comprising:

a processing unit, configured to acquire the print data from the application program and perform a processing for the print data in accordance with a print setting contained in the print setting data; and wherein, when said first determination unit determines that the print setting data contains the setting requiring the printer driver processing, said notification unit notifies the application program that the print data cannot be directly transmitted to the printing apparatus, and when said printing apparatus capability determination unit determines that the printing apparatus is capable of the direct printing, said processing unit is configured to perform a convert processing for the print data into a format processible by the printing apparatus in accordance with the print setting contained in the print setting data and said transmission unit is configured to transmit the converted print data to the printing apparatus by using the direct printing of the printing apparatus.

4. The apparatus according to claim 1, wherein the application program directly transmits the print data to the printing apparatus by using the direct printing of the printing apparatus when notified based on a notification content by said notification unit that the print data can be directly transmitted to the printing apparatus.

5. A printing control method executed by a printing control apparatus which transmits print data generated by an application program and print setting data for the print data to a printing apparatus, the method comprising:

a printing apparatus capability determination step of determining whether the printing apparatus is capable of a direct printing or not;

a first determination step of determining whether the print setting data contains a setting requiring printer driver processing after said printing apparatus capability determination step determines that the printing apparatus is capable of the direct printing; and a notification step of, when the print setting data is determined in the first determination step not to contain the setting requiring printer driver processing, notifying the application program that the print data can be directly transmitted to the printing apparatus;

a transfer step of transferring the print data acquired from the application program to a system spooler; and a transmission step of transmitting the print data from the system spooler to the printing apparatus, wherein, when said printing apparatus capability determination step determines that the printing apparatus is incapable of the direct printing or said first determination step determines that the print setting data contains the setting requiring printer driver processing, said notification step notifies the application program that the print data cannot be directly transmitted to the printing apparatus, wherein a first component of a printer driver performs said printing apparatus capability determination step, said first determination step and said notification step, wherein a second component of the printer driver performs said transfer step, and wherein said transmission step transmits the print data transferred from the application program to the system spooler without the second component of the printer driver when the direct printing is used and said first determination step determines that the print setting data does not contain the setting requiring printer driver processing.

6. The method according to claim 5, further comprising a second determination step of determining whether to ignore the setting requiring printer driver processing that is contained in the print setting data, and in the notification step, when the print setting data is determined in the first determination step not to contain the setting requiring printer driver processing, or when the setting requiring printer driver processing that is contained in the print setting data is determined in the second determination step to be ignored, the application program is notified that the print data can be directly transmitted to the printing apparatus, and otherwise, the application program is notified that the print data cannot be directly transmitted to the printing apparatus.

7. The method according to claim 5, further comprising a processing step of acquiring the print data from the application program and performing a processing for the print data in accordance with a print setting contained in the print setting data, and wherein, when said first determination step determines that the print setting data contains the setting requiring the printer driver processing, said notification step notifies the application program that the print data cannot be directly transmitted to the printing apparatus, and when said printing apparatus capability determination step determines that the printing apparatus is capable of the direct printing, said processing step performs a convert processing for the print data into a format processible by the printing apparatus in accordance with the print setting contained in the print setting data and said transmission step transmits the converted print data to the printing apparatus by using the direct printing of the printing apparatus.

8. The method according to claim 5, wherein the application program directly transmits the print data to the printing apparatus by using the direct printing of the printing apparatus when notified based on a notification content in the notification step that the print data can be directly transmitted to the printing apparatus.

9. A non-transitory computer-readable storage medium storing a program for causing a computer to execute the method of controlling a printing control apparatus defined in claim 5.

* * * * *